(12) United States Patent
Prejean

(10) Patent No.: US 7,156,206 B2
(45) Date of Patent: Jan. 2, 2007

(54) CLIMBING TREE STAND WITH SUPPLEMENTAL BRACING MEMBERS

(76) Inventor: L. Wayne Prejean, 291 Tanner Rd., Searcy, AR (US) 72143

( * ) Notice: Subject to any disclaimer, the term of this patent is extended or adjusted under 35 U.S.C. 154(b) by 0 days.

(21) Appl. No.: 11/032,246

(22) Filed: Jan. 10, 2005

(65) Prior Publication Data

US 2005/0145436 A1    Jul. 7, 2005

Related U.S. Application Data

(63) Continuation-in-part of application No. 10/214,261, filed on Aug. 7, 2002.

(60) Provisional application No. 60/310,958, filed on Aug. 8, 2001.

(51) Int. Cl.
 *A01M 31/00* (2006.01)
(52) U.S. Cl. ...................... 182/136; 182/187
(58) Field of Classification Search ................ 182/135, 182/136, 187
 See application file for complete search history.

(56) References Cited

U.S. PATENT DOCUMENTS

| 3,955,645 | A | | 5/1976 | Dye |
| 4,316,526 | A | | 2/1982 | Amacker |
| 4,368,800 | A | | 1/1983 | Campbell |
| 4,417,645 | A | * | 11/1983 | Untz ........................... 182/135 |
| 4,593,789 | A | | 6/1986 | Treants |
| 4,726,447 | A | * | 2/1988 | Gibson et al. .............. 182/135 |
| 4,890,694 | A | * | 1/1990 | Williams ..................... 182/187 |
| 5,086,874 | A | | 2/1992 | Treants |
| 5,167,298 | A | | 12/1992 | Porter |
| 5,226,505 | A | | 7/1993 | Woller et al. |
| 5,316,104 | A | | 5/1994 | Amacker |
| 5,417,306 | A | | 5/1995 | Robl |
| 5,492,198 | A | | 2/1996 | Williams |
| 5,971,104 | A | * | 10/1999 | Woller ......................... 182/136 |
| 5,975,242 | A | * | 11/1999 | Woller et al. ............... 182/187 |
| 5,996,738 | A | | 12/1999 | Nelsen |
| 6,308,801 | B1 | | 10/2001 | Futch |
| 6,345,690 | B1 | | 2/2002 | Morris |
| 6,568,505 | B1 | * | 5/2003 | D'Acquisto ................. 182/187 |
| 6,595,325 | B1 | | 7/2003 | Ulrich |
| 6,662,903 | B1 | | 12/2003 | Johnson |
| 2002/0139615 | A1 | | 10/2002 | Penz et al. |
| 2003/0024767 | A1 | * | 2/2003 | Lane ........................... 182/136 |
| 2003/0221909 | A1 | | 12/2003 | Wolford |

* cited by examiner

*Primary Examiner*—Alvin Chin-Shue
(74) *Attorney, Agent, or Firm*—Young Basile

(57) ABSTRACT

A climbing tree stand for engaging a support is disclosed. The climbing tree stand comprises a platform member adapted to receive the placement of at least one human foot in a first position, at least one supplemental bracing member provided on the platform member and adapted to receive the placement of said at least one human foot in a second position, and at least one foot receiving member provided on the platform member and adapted to engage said at least one human foot in said first and second positions. The climbing tree stand may further comprise two pivot arms pivotally connected to the platform member for engaging the support and a flexible connector connected to the platform member for engaging the support.

3 Claims, 15 Drawing Sheets

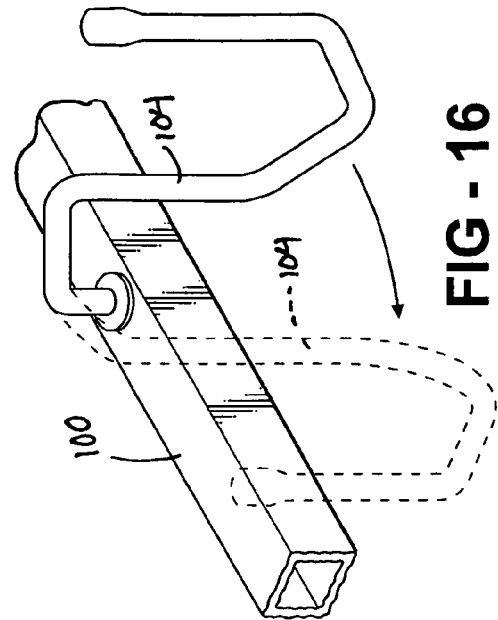
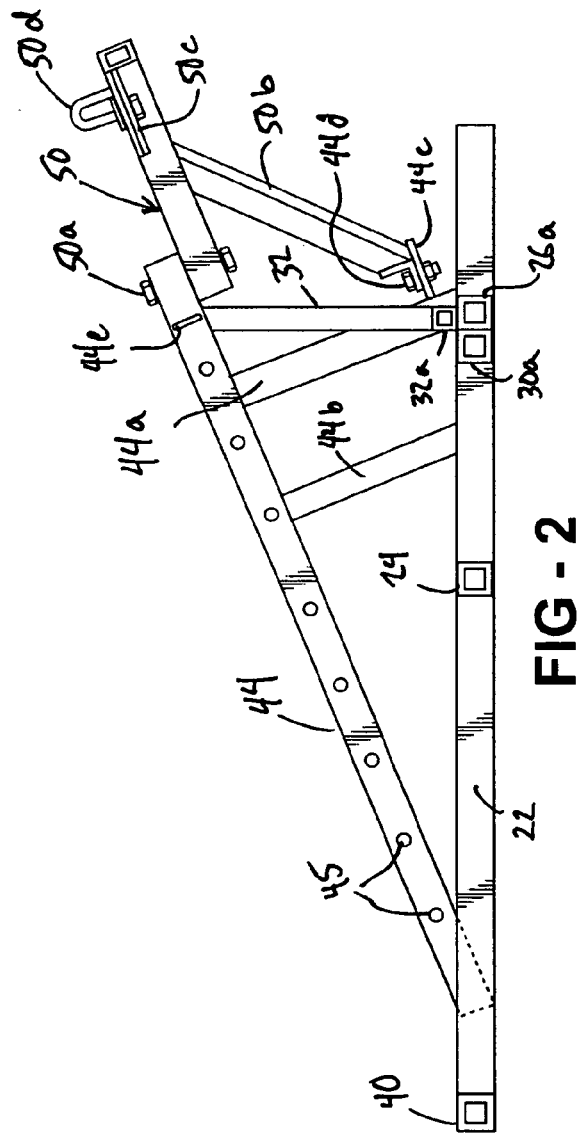
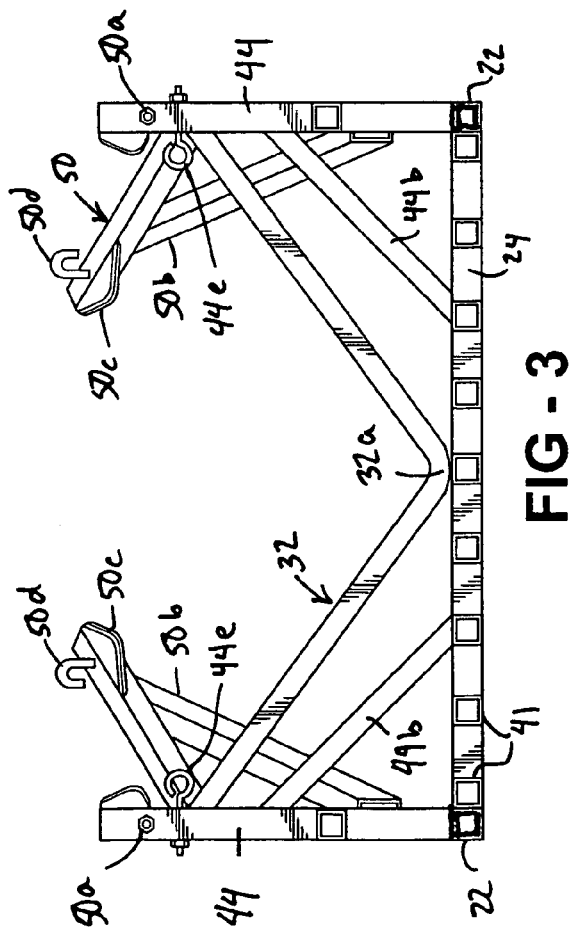

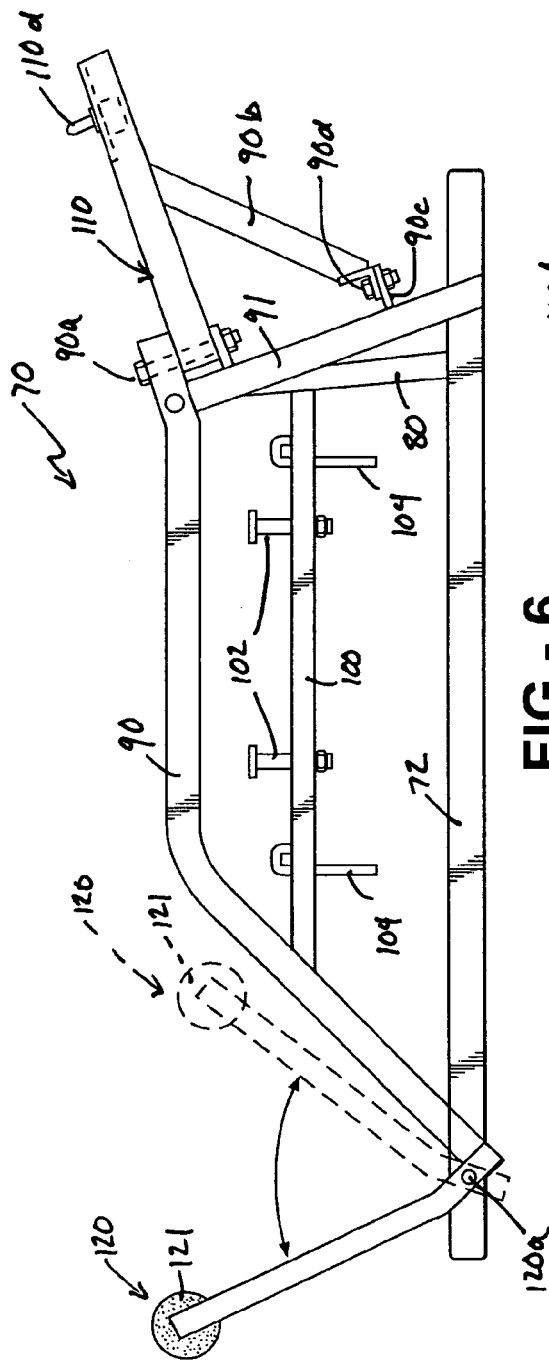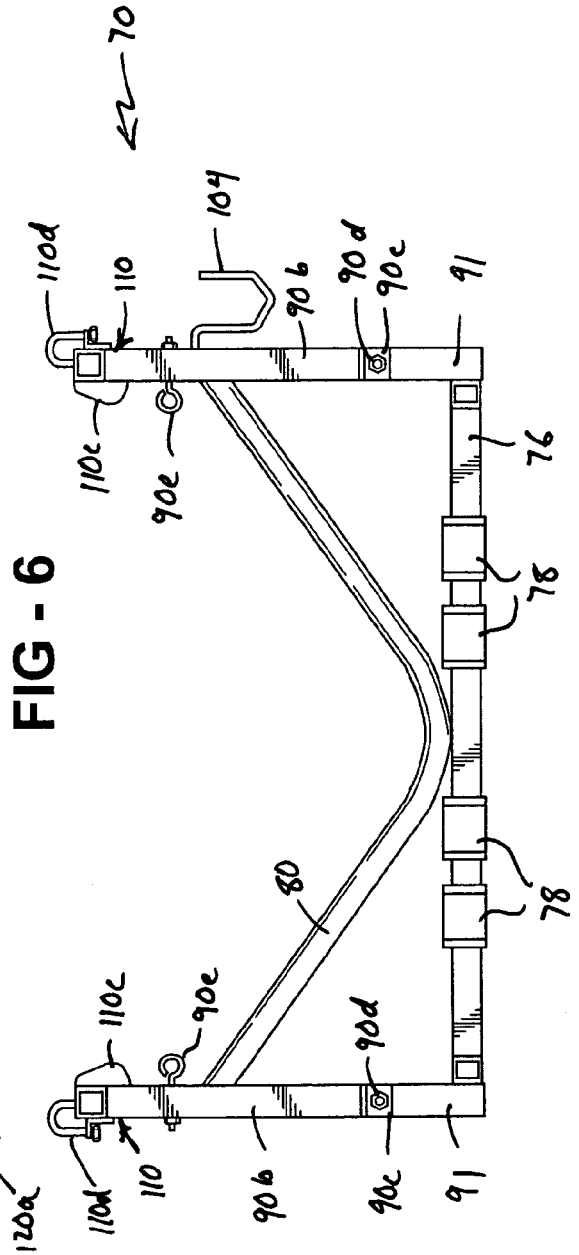

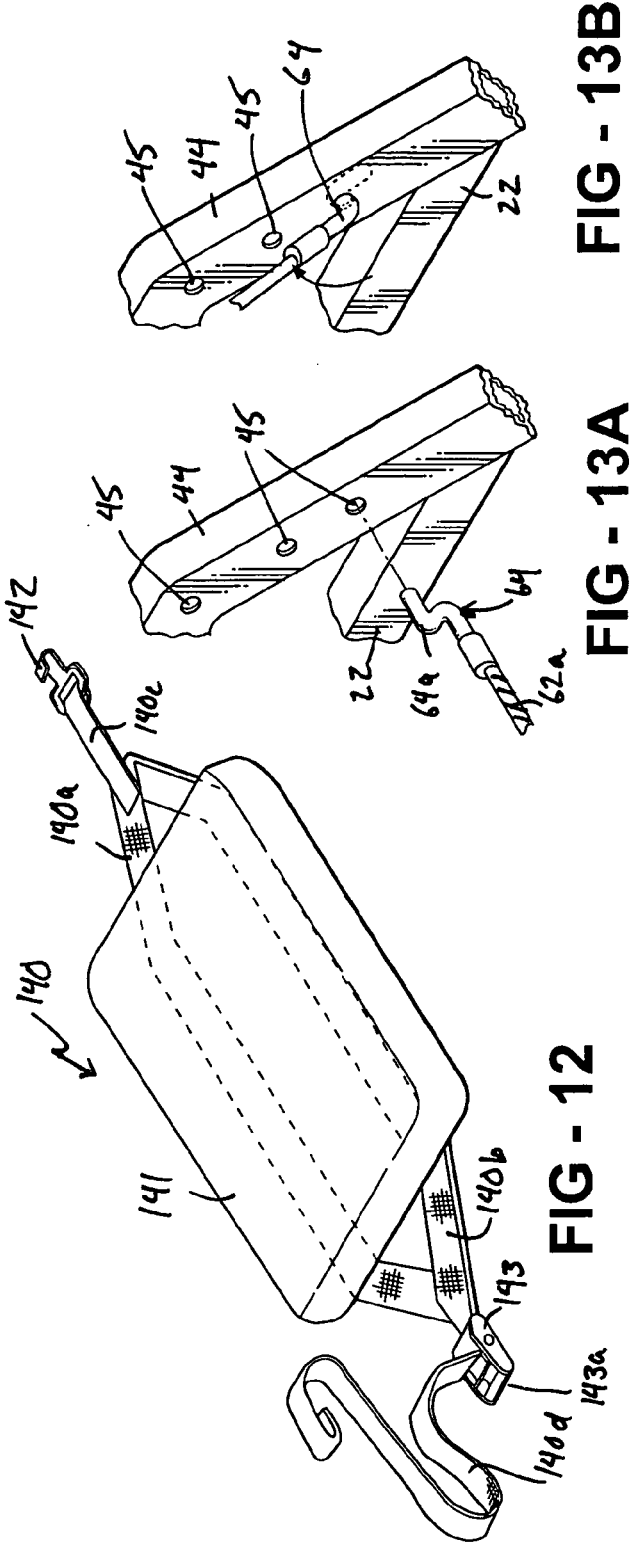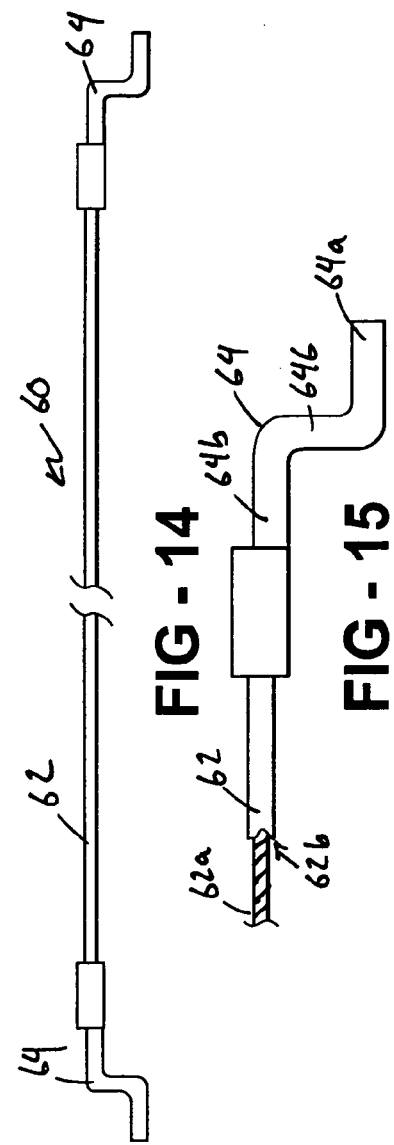

CLIMBING TREE STAND WITH SUPPLEMENTAL BRACING MEMBERS

This application is a continuation-in-part of prior U.S. patent application Ser. No. 10/214,261, filed Aug. 7, 2002, which claims the benefit of U.S. Provisional Patent Application No. 60/310,958, filed Aug. 8, 2001.

FIELD OF THE INVENTION

The present invention relates to climbing tree stands such as those used by deer hunters, naturalists, and outdoor photographers. In particular, the invention relates to climbing tree stands for hunters.

BACKGROUND OF THE INVENTION

Climbing tree stands are well known in the hunting art. Such stands may be placed on a tree or pole and used to elevate the hunter or other user to a desired height for viewing and hunting game animals such as deer.

Climbing tree stands generally have a lower climbing member upon which the hunter stands and an upper climbing member upon which the hunter sits. Each of the upper and lower climbing members have a jaw, blade, or other device for encircling the tree to which the climbing member is attached. Each of the jaws or blades bite into the tree to hold each of the climbing members in place after the tree stand is located in the desired position on the tree.

One of the major problems encountered with climbing stands is the possibility of losing the lower climbing member with no way to retrieve it when the stand is elevated above the ground.

An additional problem encountered with climbing tree stands occurs when the user steps too close to the tree on the lower climbing member, causing the lower climbing member to lose its bite or connection to the tree and slide down the tree. Loss of connection of the lower climbing member to the tree can result in serious or deadly injuries as the user slides down the tree.

Foot straps found on climbing tree stands of the prior art secure the user's feet to the lower climbing member in an attempt to control the position of the lower climbing member. Installing foot straps is very awkward due to body position and large hunting boots. Due to the location of the foot straps, the user is placed in a very hazardous position if applied leverage is needed to secure the lower climbing member. If the user's feet were strapped into a position near the tree, the user would not be able to step backward onto the front of the lower climbing member to increase the leveraged bite. Furthermore, foot straps force the user to bend down to release the foot straps at significant elevations above the ground, which may result in the user applying pressure to his toes for balance and releasing the bite on the tree of the lower climbing member and sliding to the ground.

Securing the upper climbing member at elevations above the ground is a problem because the upper climbing member does not have the user's weight thereon as the lower climbing member does. Therefore, when the user moves upward, the upper climbing member may be struck and released from the tree causing it to fall on top of the lower climbing member.

An additional problem results from the geometry of most trees. Since trees typically become narrower in diameter as they rise from the ground, prior art devices in this field often provide a means for adjusting the jaw, blade, or other device used for encircling and gripping the tree in order to keep the tree stand in a substantially level orientation as the user ascends the tree. Regardless of the nature of the particular adjusting mechanism employed, such adjustments typically involve time, and occasionally, risk. While these adjustments are usually necessary during ascent to keep the tree stand level, tree stand users occasionally dispense with making such adjustments during descent in order to save time. The user may simply delay making an adjustment until, due to the increasing diameter of the tree and the inability of a non-adjusted jaw, blade, or other device to accommodate that increased diameter, the tree stand simply becomes dysfunctional. As a user descends in this instance, the tree stand forms an increasingly acute angle with respect to the tree in order for the jaw, blade, or other device to accommodate the tree's increasing diameter. Since the lower platform of tree stands of this variety are articulated with the user's feet, the point of dysfunction occurs when the angle that the platform makes with respect to the tree approaches an angle corresponding to the maximum range of motion for the user's feet.

It is therefore desirable to have a climbing tree stand able to accommodate a user's descent from a tree or other support with minimal adjustment in order to save the user time in using a climbing tree stand device.

SUMMARY OF THE INVENTION

The present invention is a climbing tree stand for engaging a support, comprising a platform member adapted to receive the placement of at least one human foot in a first position, at least one supplemental bracing member provided on the platform member and adapted to receive the placement of said at least one human foot in a second position, and at least one foot receiving member provided on the platform member and adapted to engage said at least one human foot in said first and second positions. The climbing tree stand may further include two pivot arms pivotally connected to the platform member for engaging the support and a flexible connector connected to the platform member for engaging the support.

BRIEF DESCRIPTION OF THE DRAWINGS

The description herein makes reference to the accompanying drawings wherein like referenced numerals refer to like parts throughout several views and wherein:

FIG. 2 is a cross-sectional view taken along lines 2—2 of FIG. 1 of the present invention;

FIG. 3 is a cross-sectional view taken along lines 3—3 of FIG. 1 of the present invention;

FIG. 6 is a cross-sectional view taken along lines 6—6 of FIG. 5 of the present invention;

FIG. 7 is a cross-sectional view taken along lines 7—7 of FIG. 5 of the present invention;

FIG. 12 is a perspective view of the detachable seat of the present invention;

FIG. 13A is a perspective, partly cut-away, view of the fastener of the flexible connector of the present invention aligned for insertion and connection to the seating or standing platform of the present invention;

FIG. 13B is a perspective, partly cut-away, view of the fastener of the flexible connector utilized in the present invention insertion and connection to the seating or standing platform of the present invention;

FIG. 14 is a plan view, partly cut-away, of the flexible connector assembly of the present invention;

FIG. 15 is an enlarged plan view, partly cut-away, of an end of the flexible connector assembly of the present invention;

FIG. 16 is a perspective view, partly cut-away, of one of the rotating holders of the seating platform of the present invention;

DESCRIPTION OF THE ILLUSTRATED EMBODIMENTS

Figure 1:
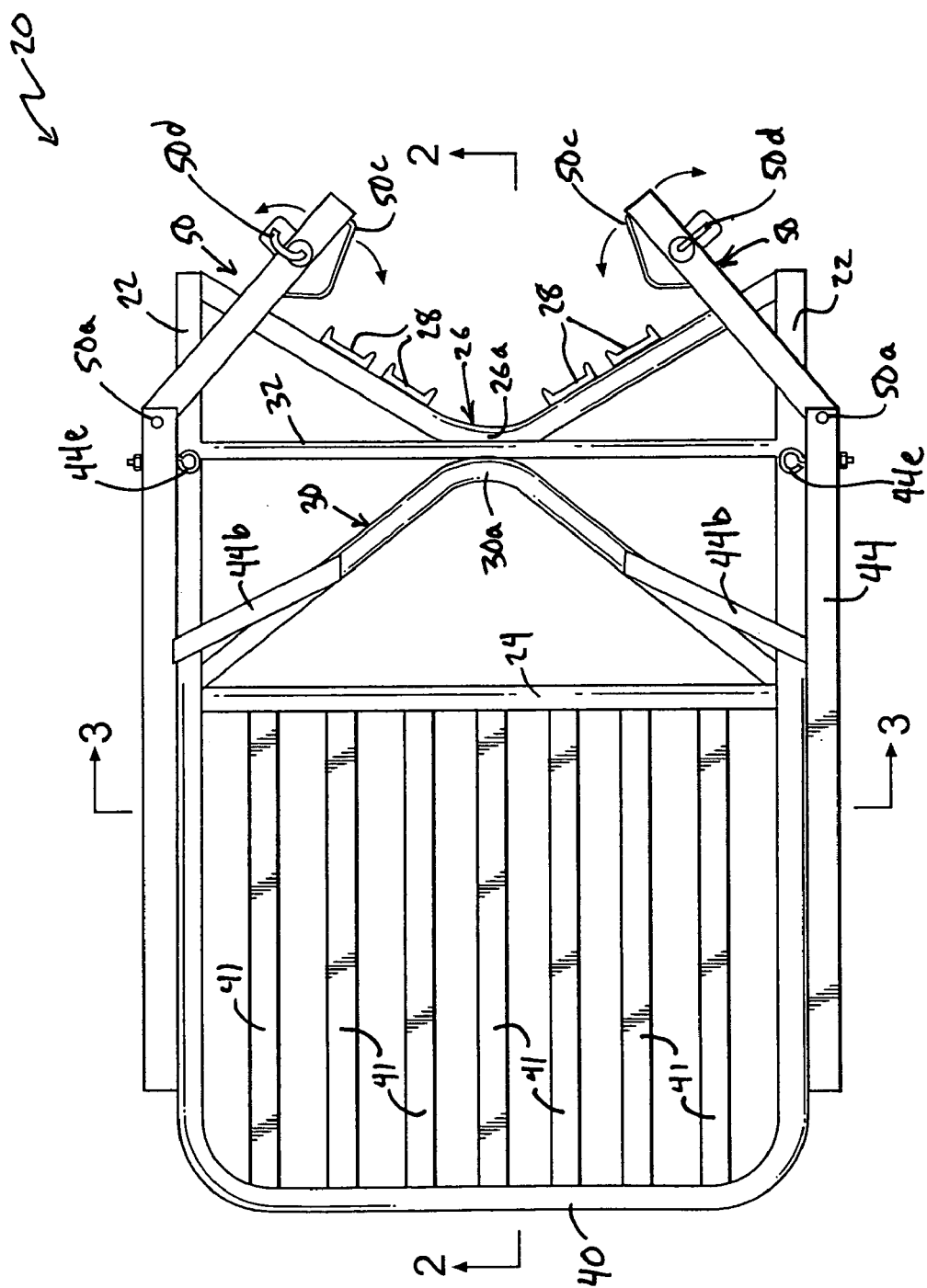
FIG. 1 is a top plan view of the standing platform of the present invention.

Referring now to the drawings, and in particular to FIG. 1, there is shown the standing platform of the invention by the numeral 20. Standing platform 20 is also shown in FIGS. 2–4, 9–11, and 17. Standing platform 20 has two spaced-apart parallel side rails 22 connected by a cross-rail 24 aligned perpendicular thereto in the approximate middle thereof.

At the inner, or tree contacting end thereof, is a generally V-shaped tree contacting member 26. Tree contacting member 26 is rigidly connected to each inner end of parallel side rails 22 and preferably lies in a plane therewith. Tree contacting member 26 preferably has a plurality of toothed members such as rectangular channels 28 which bite into the trunk of tree or pole 300 to aid in preventing standing platform 20 from sliding thereon or rotating therearound. However, rectangular channels 28 could be replaced if desired by other conventional tree contacting members known in the art such as blades or the like.

Figure 4:
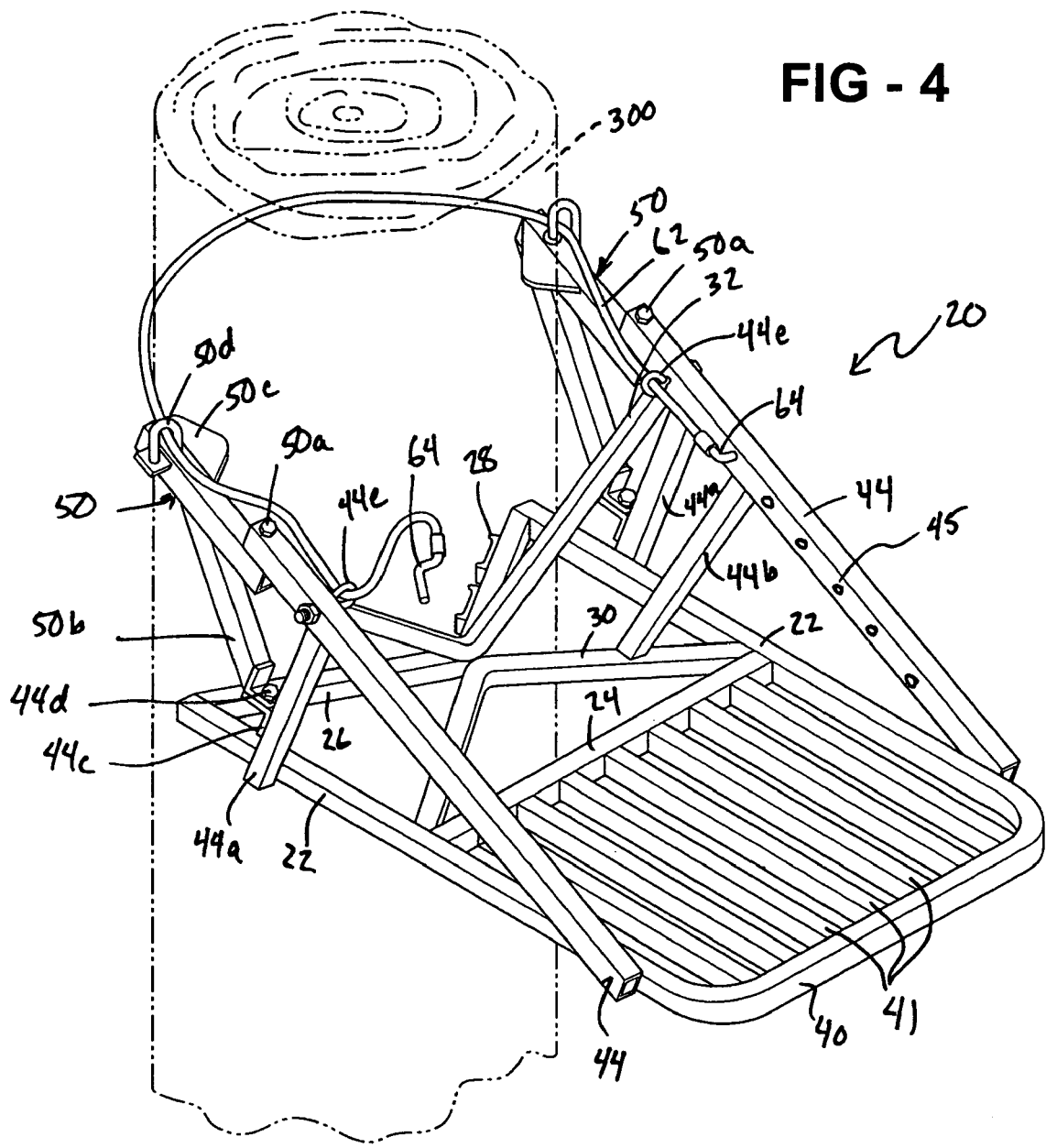
FIG. 4 is a perspective view of the standing platform of the invention connected to a tree showing connection of the flexible connector around a tree and to the platform.
Figure 5:
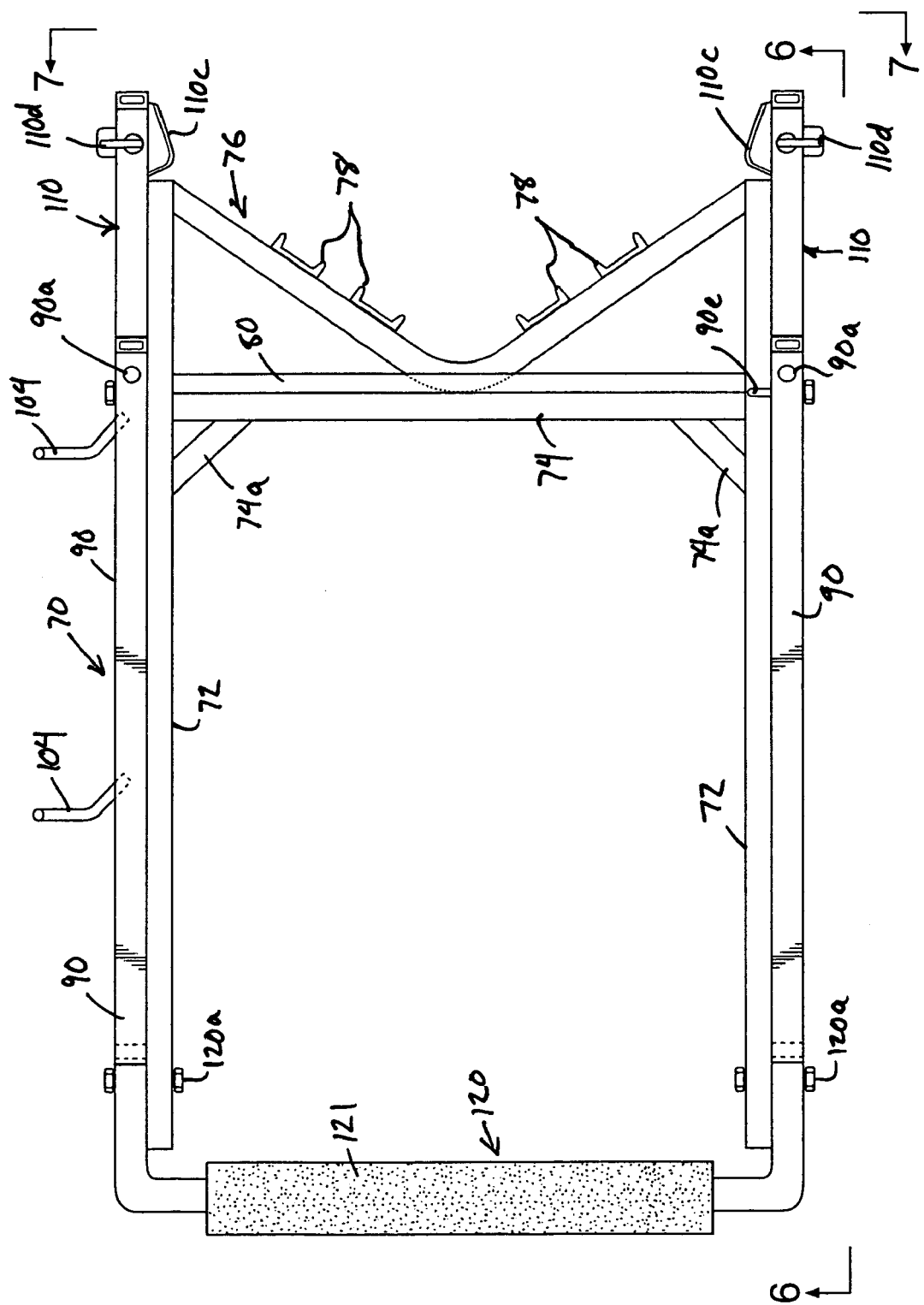
FIG. 5 is a top plan view of the seating platform of the present invention.

A second preferably generally V-shaped bracing member 30 is rigidly connected to each of the parallel side rails 22 and preferably lies in the plane therewith. Bracing member 30 is also preferably rigidly connected at its apex 30a to the apex of tree contacting member 26 as shown in FIGS. 1, 2, and 4.

A third preferably generally V-shaped bracing member 32 is rigidly connected at its ends to pivot arm support members 44 and preferably lies in a plane perpendicular to the plane containing parallel side rails 22. Bracing member 32 is also preferably rigidly connected at its apex 32a to the apex 26a of tree contacting member 26 as shown in FIGS. 1, 2, and 4.

Preferably, standing platform 20 has second cross-rail 40 connecting the two spaced-apart parallel side rails 22 aligned perpendicular thereto at the outer end thereof as shown in FIG. 1. Most preferably, cross-rail 40 is formed integrally with side rails 22 from a continuous piece of elongated, hollow rail material having a rectangular cross-section as shown in FIGS. 1–3.

Extending between cross-rail 24 and cross-rail 40 are a plurality of rigid, spaced-apart parallel members 41 which support the feet of the user when standing or sitting as shown in FIGS. 1 and 9–11.

Extending upward at an acute angle from side rails 22 are two pivot arm support members 44. Each of the pivot arm support members 44 preferably lie in a plane which is perpendicular to the plane in which side rails 22 lie, and each of the outer ends of pivot arm support members 44 are rigidly connected to side rails 22.

Figure 9:
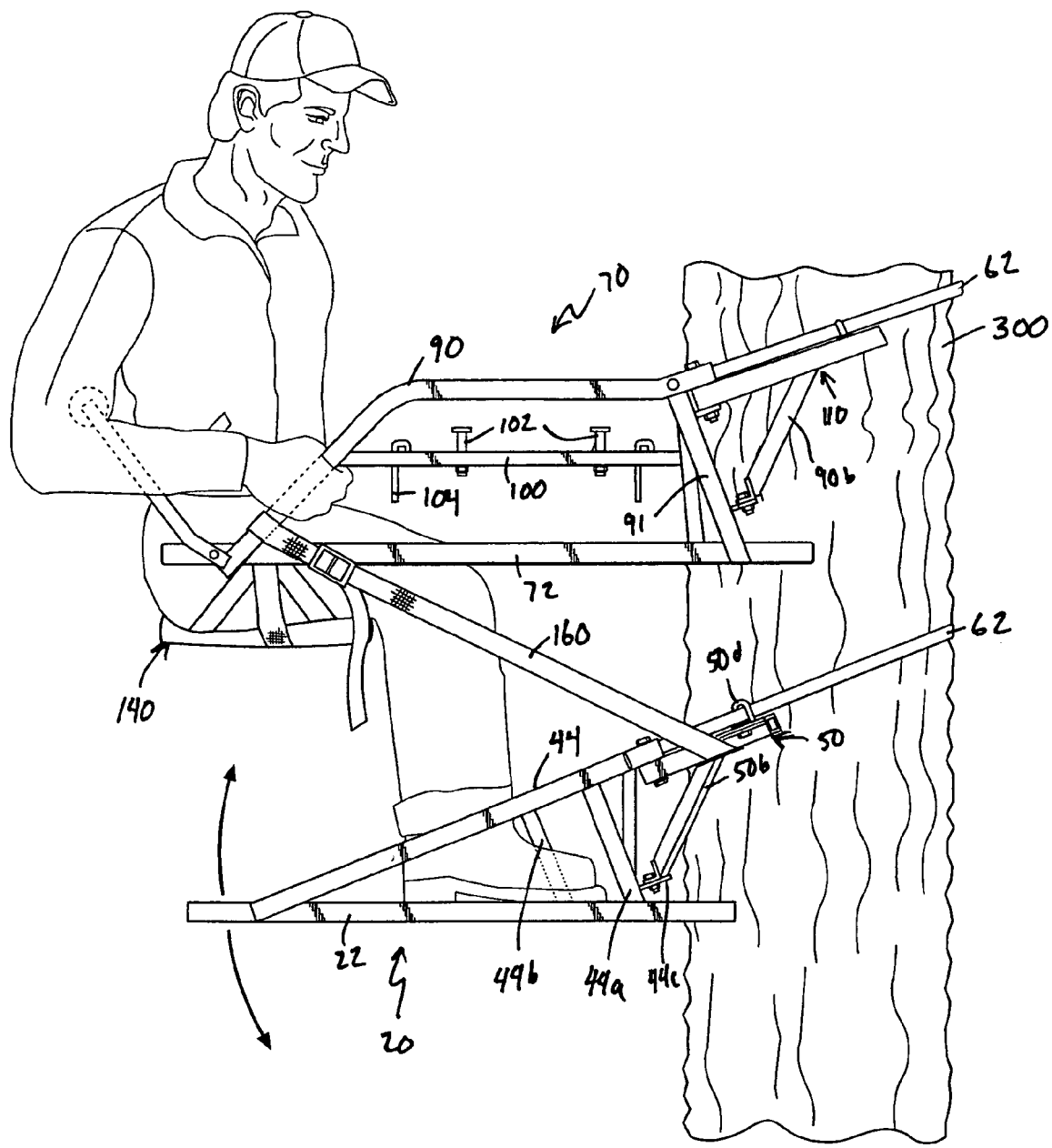
FIG. 9 is a side elevational view of the standing platform and the seating platform of the present invention connected to a tree with the user facing the tree.

Each of the pivot arm support members 44 are connected to brace members 44a which are rigidly connected to pivot arm support members 44 and to side rails 22 to provide additional support and rigidity to pivot arm support members 44. Additional support for pivot arm support members 44 is also provided by foot receiving members 44b which are rigidly connected to pivot arm support members 44 and to V-shaped bracing member 30. Foot receiving members 44b are also configured to receive each foot of the user therein to enable the user raise or lower standing platform 20 when seated as indicated in FIG. 9 without the difficulty of bending own and installing foot straps as taught in the prior art. Furthermore, foot receiving members 44b offer the user better control of standing platform 20 when climbing due to solid contact of the feet of the user with the standing platform 20 on four sides of each foot.

Pivotally connected to the inner ends of each of the two pivot arm support members 44 is a pivot arm 50. Pivot arms 50 are pivotally connected to the inner ends of the two pivot arm support members 44 by bolts 50a. Pivot arms 50 have pivot arm braces 50b rigidly connected thereto at one end thereof for additional strength and support. Pivot arm braces are pivotally connected to members 44a as shown in the drawings by brackets 44c, which are rigidly connected to members 44a and bolts 44d.

Pivot arms 50 have a generally triangular tree contacting members 50c rigidly connected thereto which bite into the tree and prevent pivot arms 50 from slipping thereon. Preferably tree contacting members 50c are flat plate with a tapered outer edge for biting into a tree. Pivot arms 50 have a guide 50d connected thereto for receipt of the flexible connector assembly 60 shown in detail in FIGS. 14–15.

Figure 8:
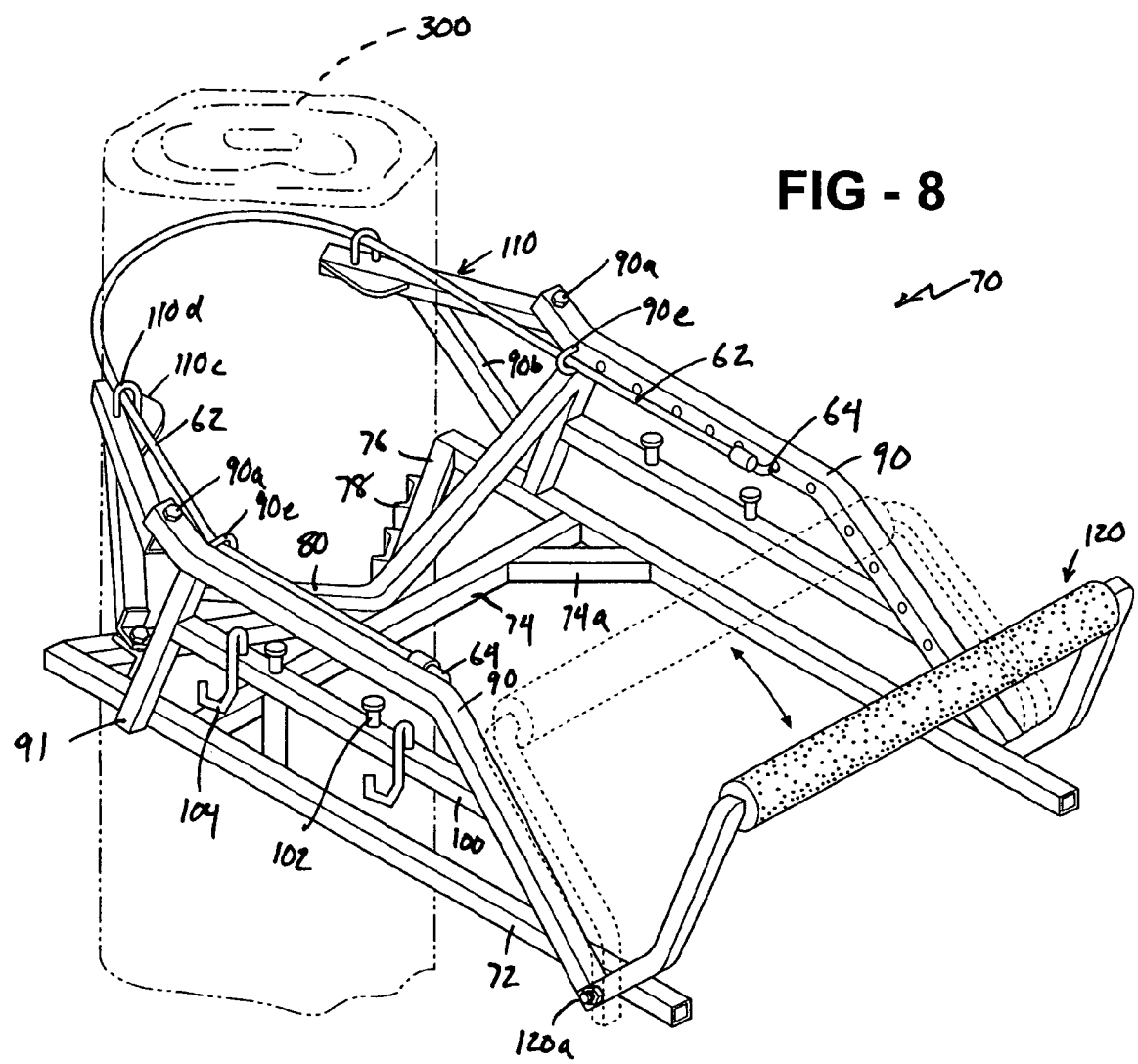
FIG. 8 is a perspective view of the seating platform of the present invention connected to a tree showing a rotatable safety rest movable between a first position and a second position shown in phantom lines.

Connector assembly 60 of the present invention includes a flexible connector 62 having a fastener 64 bonded thereto at each end thereof. As shown in detail in FIG. 15, fastener 64 has two parallel rigid arms 64a and 64b connected perpendicular to third rigid arm 64c for connection to pivot arm support members 44 by insertion of arm 64a into one of the holes 45 in pivot arm support members 44 and 90 as shown in FIGS. 8, 13a, and 13b. Thus, a user of the climbing tree stand of the present invention can quickly adjust the length of flexible connector 62 extending from standing platform 20 and climbing platform 70. This system enables fast and easy connecting of the standing platform 20 and climbing platform 70 to a tree at ground level prior to climbing the tree, and enables quick and easy adjustment at higher elevations on a tree. Furthermore, this system is inherently safer since fastener 64 cannot be lost at elevation during the climbing process. Fastener 64 may be replaced with various other types of connectors which penetrate into frame members and lock therein. Flexible connector 62 may be any conventional connector material 62a well known in the art such as a cable, wire, rope, cord, chain, belt or the like, and preferably has a plastic polymeric coating 62b thereon to prevent abrasion of the tree which it contacts and abrasion of the hands of the user.

Pivot arm support members 44 each have a flexible connector guide 44e therein for receipt of connector 62. Guide 44e also keeps the flexible connector 62 routed along the outside edge of the platforms 20 and prevents flexible connector 62 from contacting the user and restricting movement of the user inside the platform 20.

Referring now in particular to FIGS. 5–8, there is shown the seating platform 70 of the present invention. Seating platform 70 has two spaced-apart parallel side rails 72 connected by a cross-rail 74 aligned perpendicular thereto near the inner end thereof. Support braces 74a are rigidly connected to side rails 72 and cross-rail 74 to provide additional rigidity and strength.

At the inner, or tree contacting end thereof, is a generally V-shaped tree contacting member 76. Tree contacting member 76 is rigidly connected to each inner end of parallel side rails 72 and preferably lies in the plane therewith. Tree contacting member 76 preferably has a plurality of toothed members such as rectangular channels 78 which bite into the trunk of tree or pole 300 to aid in preventing seating platform 70 from sliding thereon or rotating therearound. However, rectangular channels 78 could be replaced if desired by other conventional tree contacting members known in the art such as blades or the like.

A second preferably generally V-shaped bracing member 80 is rigidly connected at its apex to tree contacting member 76 and cross rail 74 and is preferably oriented perpendicular thereto. Bracing member 80 is also preferably rigidly connected at its apex 80a to the apex 76a of tree contacting member 76 as shown in FIGS. 5–8.

Extending upward at an angle from side rails 72 are two pivot arm support members 90. Each of the pivot arm support members 90 preferably lie in a plane which is perpendicular to the plane in which side rails 72 lie, and each of the pivot arm support members 90 are rigidly connected at their outer ends to side rails 72.

Each of the pivot arm support members 90 are connected to brace members 91 which are rigidly connected to pivot arm support members 90 and to side rails 72 to provide additional support and rigidity to pivot arm support members 90. Additional support for pivot arm support members 90 is also provided by V-shaped bracing member 80 which is rigidly connected at each end thereof to pivot arm support members 90.

Figure 11:
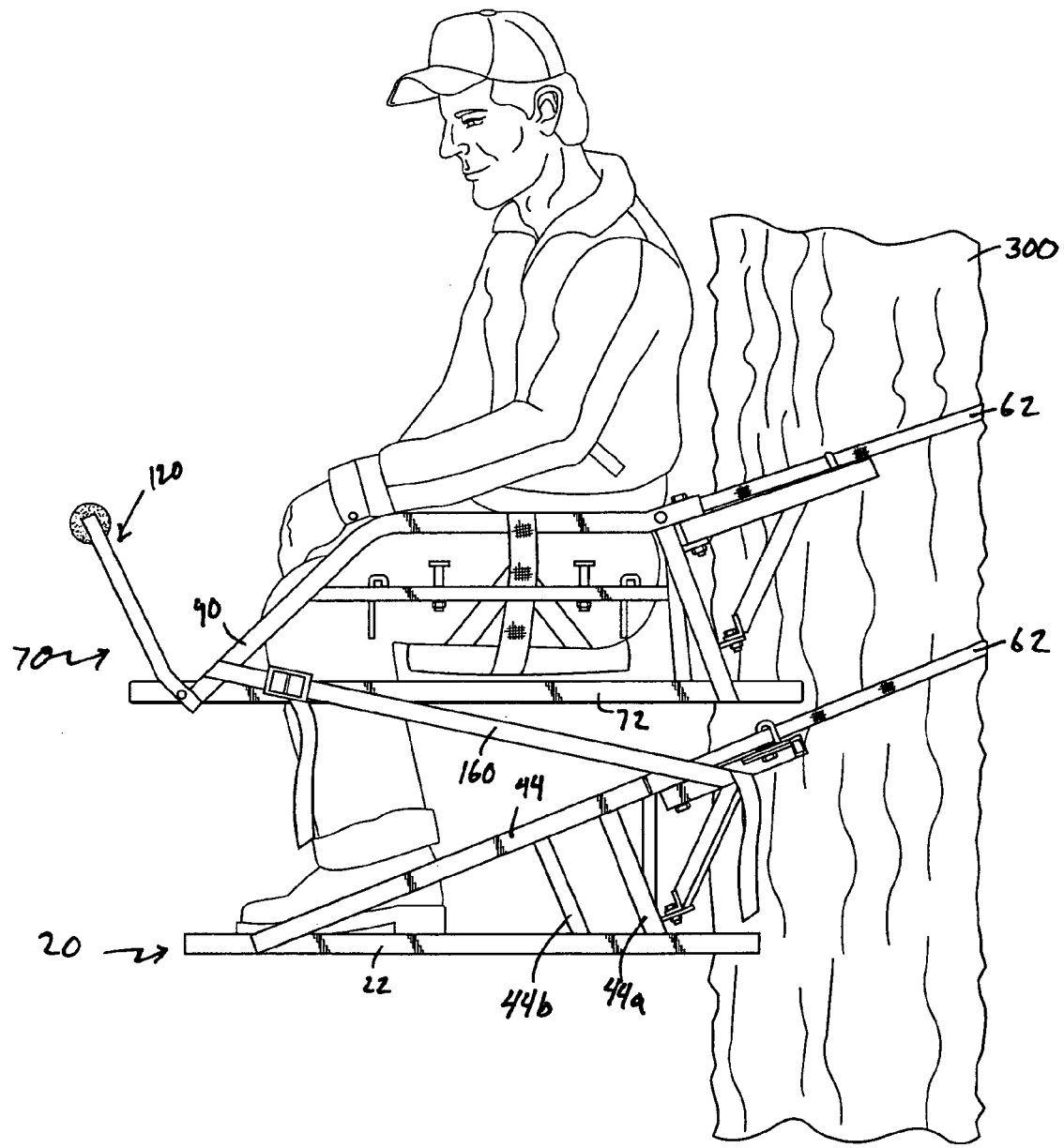
FIG. 11 is a side elevational view of the standing platform and the seating platform of the present invention connected to a tree with the user's back to the tree.

An intermediate seat supporting member 100 is rigidly connected at one end to pivot arm support members 90 and at the other end to brace members 91. Seat supporting member 100 supports a seat, as shown in FIG. 11, and accessory knobs 102 and rotating gun and quiver holders 104.

Pivotally connected to the inner ends of each of the two pivot arm support members 90 is a pivot arm 110. Pivot arms 110 are pivotally connected to the inner ends of the two pivot arm support members 90 by bolts 90a. Pivot arms 110 have pivot arm braces 90b rigidly connected thereto at the upper end thereof, and pivot arm braces 90b are pivotally connected to brace members 91 as shown in FIGS. 6–7 by brackets 90c, which are rigidly connected to brace members 91 and by bolts 90d.

Pivot arms 110 have a generally triangular tree contacting member 110c rigidly connected thereto which bite into the tree 300 and prevent pivot arms 110 from slipping thereon. Pivot arms 110 also have a guide 110d connected thereto for receipt of the connector assembly 60 shown in detail in FIGS. 14–15. Pivot arm support members 90 each have a connector guide 90e thereon for receipt of flexible connector 62 and holes 45 on the surface thereof for receipt of locking arm 64 of connector assembly 60 as shown in FIGS. 13A–13B. Guide 90e also keeps flexible connector 62 routed along the outside edge of the platform 70 and prevents flexible connector 62 from contacting the user and restricting movement of the user inside the platform 70.

If desired, pivot arms 110 and pivot arm braces 90b could be eliminated from seating platform 70. The remaining elements of seating platform 70 would function as described.

Preferably, seating platform 70 has a rotatable safety rail 120, although rail 120 could be removed if desired. Rail 120 may function as a back rest or shooting support as desired and is preferably U-shaped and has a soft material 121 therearound such as foam rubber. Rotatable rail 120 is pivotally connected to rails 72 by bolts 120a.

In FIG. 12 is shown the detachable seat assembly 140 of the invention. Seat assembly 140 has triangular belts 140a and 140b extending from opposite sides of seating member 141. Seating member 141 is preferably a cushion which is preferably generally rectangular in shape, although other desired shapes such, as an oval-shaped cushion, could be used if desired. Furthermore, the seating member could be a flexible woven material, such as a web or net, if desired.

Figure 10:
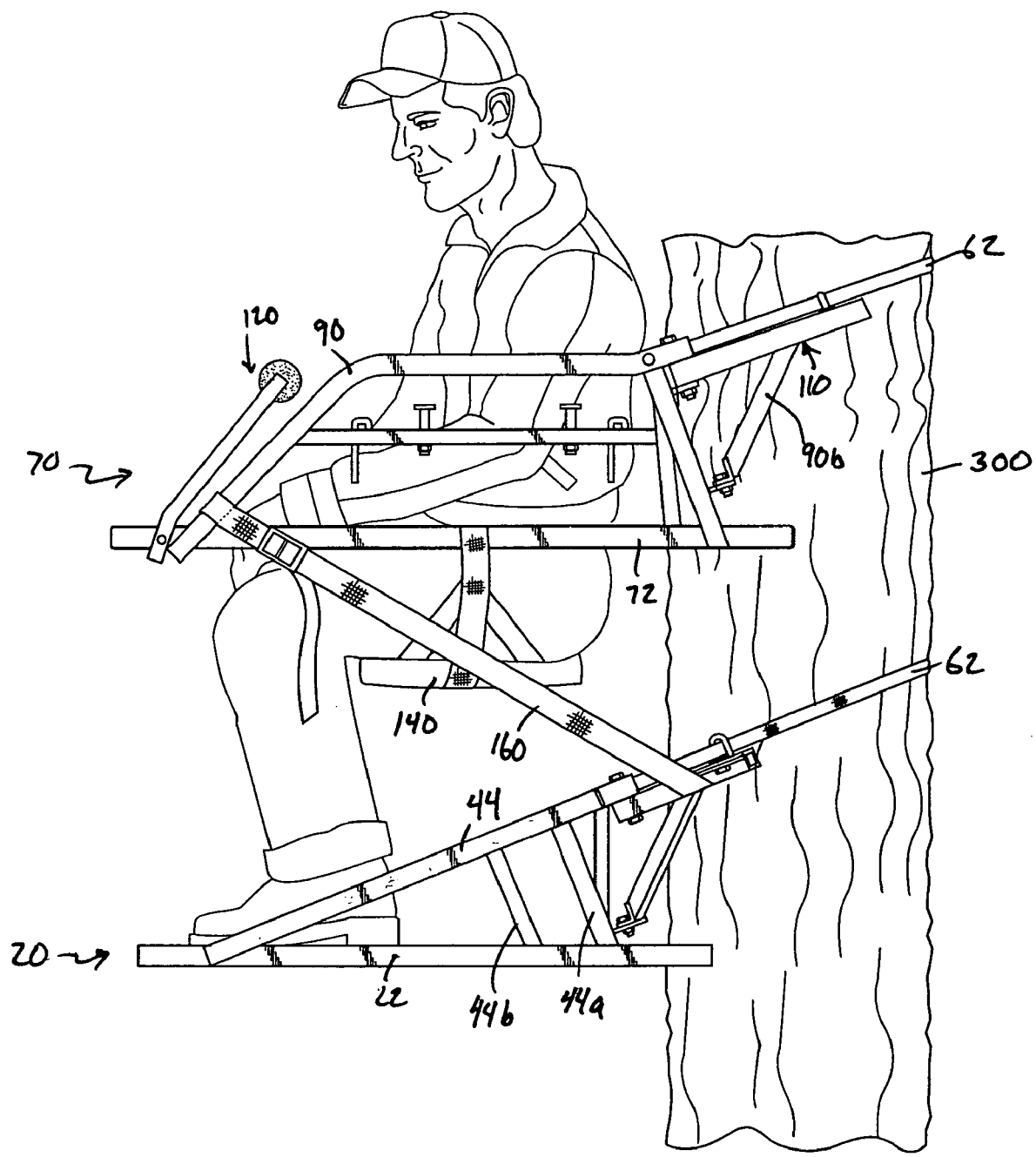
FIG. 10 is a side elevational view of the standing platform and the seating platform of the present invention connected to a tree with the user's back to the tree.

Triangular belt 140a terminates in a strap 140c having a connector hook 142 thereon and triangular belt 140b extending from the opposite side thereof terminates in a strap 140d having an adjustable strap receiver 143 thereon for receipt of hook 142 to enable quick and easy movement of seat assembly 140 to three positions, shown in FIGS. 9–11. Adjustable strap receiver 143 is a conventional adjustable strap receiver well-known in the art which can be moved to various positions on strap 140d and locked onto strap 140d at the desired position. Adjustable strap receiver 143 has a clasp 143a for receipt of hook 142 and enables the length of adjustable strap receiver 143 from cushion 141 to be changed as desired to fit the various positions of seat assembly 140, shown in FIGS. 9–11.

Detachable seat assembly 140 allows the hunter or other user many options. For example, leaving the climbing tree stand at the base of a selected tree overnight is a common practice. This reduces packing labor if the hunter decides to return later for another hunt. However, human scent is implanted and concentrated in the seat cushion attached to the stand at ground level or nose level of the animals in the area which broadcasts the hunter's presence while the hunter is away from the stand site. The scent on the seat can inform animals in the area of the hunter's presence and ruin his stand site for future use. Many seats and cushions of the climbing tree stands of the prior art are permanently attached to the stand and cannot be removed, whereas the detachable seat assembly 140 of the present invention can be quickly detached and carried home with the hunter each time the hunter leaves the stand.

Figure 17:
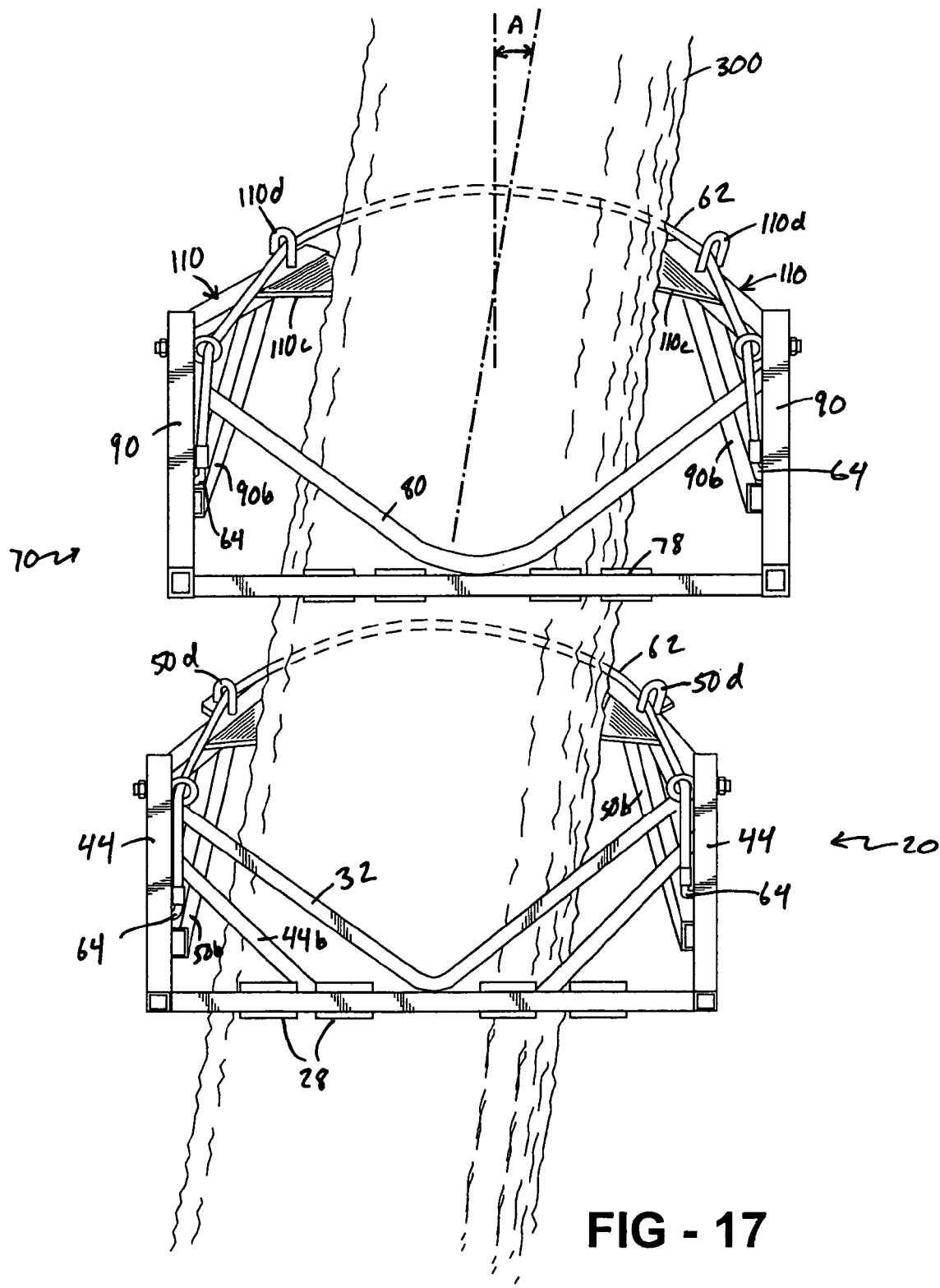
FIG. 17 is a front elevational view of the standing platform and the seating platform of the present invention connected to a tree leaning at an angle A with the vertical wherein the seating platform is aligned horizontally parallel with the standing platform.

In FIG. 17 in shown a front elevational view, partly cut-away, of the standing platform 20 and the seating platform 70 of the present invention connected to a tree 300 leaning at an angle A with the vertical wherein the seating platform 20 is aligned horizontally parallel with the standing platform 70. The pivot arms 50 and 110 pivot to the left and right for flexibility to conform with tree irregularities, thereby enabling the user to level the tree stand, i.e., align the seating platform 70 and standing platform 20 horizontal with the ground even on a leaning tree. In FIG. 17, the safety rail 120 and the seat 140 are shown removed for purposes of illustration, although it is preferred that the safety rail be attached at all times to seating platform 70 to prevent the hunter from falling from the tree 300.

As shown in FIG. 9, a user such as a hunter is sitting on detachable seat assembly 140 connected near the outer end of the seating platform 70 to the bottom side rail 72 of seating platform 70, the user facing the tree 300 in the climbing or lowering position. As can be seen in FIG. 9, the feet of the user are resting on standing platform 20 and positioned under foot receiving members 44b to move the standing platform 20 upward or downward with the user's feet as indicated by the arrows in FIG. 9, and the hands of the user are grasping pivot arm support members 90 to raise or lower seating platform 70. When the user reaches the desired height on tree 300, the user can remain seated in the position shown in FIG. 9 and use the tree 300 as cover to prevent game animals from seeing him. The user can point a firearm or bow or camera toward game on the opposite side of tree 300. Safety rail 120 functions as a back rest for the user in the position shown in FIG. 9.

As shown in FIG. 10, a user is sitting in a low position on movable seat 140 which is connected near the end of seating platform 70 to the bottom side rail 72 of seating platform 70 with the user's back to the tree 300 in a hunting or observing position: The feet of the user are resting on standing platform 20 near the outer end of standing platform 20, standing platform 20 and seating platform 70 being connected together by connecting strap 160. As shown in FIG. 11, pivot arm support members 90 can be used as arm rests. The user may sit upright or slide movable seat 140 away from tree 300 for a more reclined position.

If desired, the user can move seating platform 70 upward until support members 90 are at elbow level with the user. Movable seat 140 can then be used as a back tree pad. Such a position would provide the safety rail 120, gun and quiver holders 104, accessory knobs 102 with gear attached for use at elbow level when the hunter is standing, enabling the hunter to hunt in comfort and safety. Safety rail 120 may be used as a firearm or camera rest, and as an additional safety restraint if the user stands up and should lean or fall forward away from tree 300.

Furthermore, the movable and detachable seat 140 allows the user to relocate the seat front to back or back to front without having to step over the seat 140. Stepping over a seat at elevation is a major safety hazard and bother; with the movable, detachable seat 140 of the invention, this hazard is eliminated.

As shown in FIG. 11, the user is sitting on movable seat 140 connected near the inner end of seating platform 70 to pivot arm support rail 90 of seating platform 70 with the user's back to tree 300 in a hunting or observing position. This position provides more clearance for a user such as a bow hunter who can stand up on standing platform 20 without his bow striking any part of seating platform 70.

Standing platform 20 and seating platform 70 are preferably connected together by two adjustable connecting straps 160 which connect to the outer portion of the seating platform 70 and to each pivot arm 50 of standing platform 20, as shown in FIGS. 9–11. Adjustable connecting straps 160, one on each side of platforms 20 and 70, prevent the standing platform 20 from sliding down a tree 300 when the user is sitting on seating platform 70, as shown in FIGS. 9–11, and also enables the two platforms to be snugly fastened together when in the positions shown in FIGS. 9–11. Should the standing platform 20 move past the adjusted length of straps 160, the straps 160 will force pivot arms 50 to grab and bite tree 300 and at the same time apply force to the outer end of seating platform 70 to cause seating platform 70 to bite into tree 300, thus virtually eliminating the possibility of sliding down a tree accidentally.

To move the standing platform 20 or seating platform 70 upward or downward on a tree, safety straps 160 are adjusted to be long enough to accommodate the distance each platform 20 and 70 is moved relative to the other as a user ascends or descends from a tree or pole. When the user reaches the desired height, adjustable safety straps 160 are tightened by the user to the position shown in FIGS. 9–11 to secure the standing platform 20 and seating platform 70 at elevation for stability. Once the user climbs to elevation and stands up on the standing platform 20, seating platform 70 is unstable due to its light weight. To secure the standing platform 20 and the seating platform 70, the user remains seated on the seating platform 70 when the desired elevation is reached, and the adjustable straps 160 are tightened. After tightening straps 160, when the user stands up on the standing platform 20, the standing platform 20 and the seating platform 70 will be under tensile forces from straps 160 and will be bound together as one unit.

A final use for adjustable straps 160 is for securing standing platform 20 to seating platform 70 for packing. To pack the platforms together, standing platform 20 is placed in seating platform 70 and straps 160 are wrapped around both platforms. The ends of straps 160 are then buckled together and tightened.

As can be seen from the above description of the invention, flexible connector 62 extends from the sides of standing platform 20 and seating platform 70 through guides or eyes 50d and 110d at the end of pivot arms 50 and 110 near tree contacting members 50c and 110c. Thus, flexible connector 62 only contacts the trunk of tree 300 on the back side of the tree away from platforms 20 and 70 when body weight is placed on each platform 20 or 70, and flexible connector 62 forces tree contacting members 50c and 110c toward the trunk of tree 300 to bite into the trunk of tree 300 to provide greatly increased stability of platforms 20 and 70, even on a leaning tree such as shown in FIG. 17. Contacting members 50c and 110c may have more aggressive shapes if desired for additional bite into tree 300.

Flexible connector 62 may be routed on the left, right, top, or bottom of the exterior of pivot arm support members 44 and 90. Flexible connector 62 is routed on the exterior of support members 44 and 90 through guides 44e and 90e, and on the exterior of pivot arms 50 and 110 through guides 50d and 110d, to reduce noise and make connection of flexible connector 62 and adjustment of flexible connector 62 easier, and to enable the user to see that connection is made. Guides 44e, 90e, 50d, and 110d are shown in the drawings as an eyebolt but may be replaced with an "C", "U" or "J" type connector guide positioned as eyebolts 50d and 110d are to cause flexible connector 62 to always pull the guide toward the trunk of tree 300.

Commonly, leveraged bite on standing and climbing platforms of the prior art is accomplished by applied pressure on the front of a tree by platform contacts and on the back of a tree by rigid "V" shaped bars, blades, flexible connectors, cables or chains, whereas the pivot arms 50 and 110 of the present invention provides additional bite on the sides of the tree, thereby doubling the bite for greatly enhanced stability.

Turning to FIGS. 18–22, an alternative embodiment of the standing platform 20 is disclosed. Similar to the embodiment of standing platform 20 disclosed in FIGS. 1–17, standing platform 20 has two spaced apart parallel side rails 22 connected by cross rails 24 and 40. Parallel members 41 substantially form the standing surface of standing platform 20. Parallel members 41 are further supported by reinforcing members 42. Side rails 22, cross rails 24, 40, and parallel members 41 are all constructed from square aluminum tubing. These members are fastened together through the use of welding, soldering, or other means suitable for joining adjacent pieces of structural aluminum tubing. Alternatively, these members may be constructed from wood, steel, or other substantially rigid material suitable for use as a structural support. Reinforcing members 42 are constructed from flat, aluminum stock and are similarly welded, soldered, or otherwise rigidly connected to parallel members 41.

Providing additional structure to standing platform 20 are pivot arm support members 44 attached to side rails 22 and extending diagonally upwardly therefrom in the direction of cross rail 24. Pivot arm support members 44 are attached at one end to side rails 22 and at the other end to brace members 44a. Brace members 44a in turn extend down from pivot arm support members 44 to, meet side rails 22. Each of side rails 22, pivot arm support members 44, and brace members 44a substantially form a triangularly-shaped side to standing platform 20. As with side rails 22, pivot arm support members 44 and brace members 44a are similarly constructed from aluminum or other suitably rigid material. Brace members 44a are constructed from substantially rectangular tubing. Pivot arm support members 44 are substantially L-shaped in cross section. Pivot arm support members 44 thereby meet side rails 22 at a lap joint and similarly lap over the top of brace members 44a. Holes 45 are provided along the upper face of pivot arm support members 44, as will be further described below.

In order to provide means for engaging a user's foot, foot receiving members 44b are provided. Foot receiving members 44b are substantially flat pieces of aluminum or other suitably rigid material, and each extends from one of the pivot arm support members 44 down to one of the parallel members 41 that substantially form the standing surface of standing platform 20. Foot receiving members 44b are similarly soldered, welded, or otherwise rigidly attached to the pivot arm support members 44 and parallel members 41.

Substantially V-shaped bracing member 32 provides additional support, contacting each of brace members 44a substantially near where brace members 44a connect to pivot arm support members 44. Additionally, bracing member 32 connects to cross rail 24 substantially at the center line (not shown) of standing platform 20. Bracing member 32 is similarly formed from square aluminum tubing or other substantially rigid material that is connected to brace members 44a and cross rail 24 by welds, solder, or the like. Tree contacting members 26 are provided each connecting one of side rails 22 with cross rail 24 in a substantially V-shaped formation in order to engage a tree or other support 300. Tree contacting members 26 are similarly constructed from square aluminum tubing or the like and are secured with welds, solder, or similar fastening means. Rectangular channels 28 or other similar toothed members are provided on the tree-facing surface of tree contacting members 26 to provide additional bite when standing platform 20 is attached to a tree or other support 300.

In the embodiment of the standing platform 20 as shown in FIGS. 18–22, pivot arm connectors 162 and supplemental bracing members 164 are provided on each of brace members 44a. Pivot arm connectors 162 and supplemental bracing members 164 are in a substantially parallel alignment with pivot arm support members 44. Each of supplemental bracing members 164 is additionally connected to respective side rails 22. Further, each of pivot arm connectors 162 and supplemental bracing members 164 extend slightly beyond the front face of brace members 44a in order to provide pivotal clearance for connecting to pivot arms 50 and pivot arm braces 50b, respectively. Each of pivot arm connectors 162 and supplemental bracing members 164 are constructed from substantially square aluminum tubing or other similar rigid material, and each are connected to brace members 44a and, in the case of supplemental brace members 164, to side rails 22, by solder, welds, or other secure, rigid fastening means. Holes (not shown) are provided through each of pivot arm connectors 162 and supplemental bracing members 164 along an axis substantially parallel to each of brace members 44a for receiving bolts 50a and 44d therethrough. Bolts 50a and 44d are similarly threaded through holes (not shown) provided in pivot arms 50 and pivot arm braces 50b, respectively. Washers are provided at each bolted joint, and bolts 50a and 44d are appropriately tightened to allow pivot arms 50 and pivot arm braces 50b to freely pivot about bolts 50a and 44d.

In order to enhance the bite of each of pivot arms 50 into a tree or other support 300, tree contacting members 50c are provided on each of pivot arms 50. In order to maximize the bite and leverage provided by tree contacting members 50c, those members are connected to each of pivot arms 50 at the end remote from the axis about which each of pivot arms 50 rotates. Each of tree contacting members 50c are constructed from aluminum or other substantially rigid material. Each is rigidly connected to a respective pivot arm 50 by welding, soldering, fasteners, or other means suitable for providing a rigid connection. Further, each of tree contacting members 50c is provided with an abraded surface 166 to increase the frictional forces generated between the tree contacting members 50c and the tree or other support 300.

A connector assembly 60 is provided to encircle a tree or other support 300 and act in leveraged opposition to tree contacting members 26. The connector assembly 60 includes a flexible connector 62 and fasteners 168 attached to each end of flexible connector 62. The flexible connector 62 is a cable, chain, rope, wire, belt, or other substantially inelastic continuously articulable device that is capable of being bent around a tree 300 or other irregularly shaped object. The flexible connector 62 is secured to one of the pivot arm support members 44 at one end by means of fastener 168. The flexible connector 62 traverses one of pivot arms 50 by means of guides 50*d*. The flexible connector 62 surrounds a tree or other support 300, encounters guides 50*d* provided on the opposite pivot arm 50, and connects by means of fastener 168 to the second pivot arm support member 44. The fasteners 168 are provided with a mechanism to cooperatively engage any of holes 45 provided in pivot arm support members 44. In the embodiment shown in FIGS. 18–22, fasteners 168 each include a bolt cooperatively engageable with any of holes 45, and one or more compressible washers capped with a wing nut 170 for tightening or loosening the fasteners 168 within any of holes 45.

In order to provide a user with additional configurations of the standing platform 20 in which to find suitable postures for hunting, photography, or other activities, a footrest 172 is provided near cross rail 40. Footrest 172 is pivotally mounted to each of side rails 22 through the use of nuts, washers, and bolts, or other means for providing a pivotal connection. Footrest 172 is substantially U-shaped and is formed from a continuous piece of square aluminum tubing. Other substantially rigid materials may also be used. Stops 174 are provided on each end of footrest 172. The stops 174 engage each of side rails 22 to limit the pivotal travel of the footrest 172 so that the footrest 172 does not decline below the plane substantially formed by the parallel members 41 of the standing platform 20. This feature provides a measure of safety so that a user of standing platform 20 may appropriately sense the perimeter of standing platform 20 when either facing away from cross rail 40 or when using standing platform 20 in low light conditions.

In operation, a user of the standing platform 20, as shown in the embodiment in drawing FIGS. 18–22, uses it in conjunction with a seating platform 70 in a manner similar to that described and shown above. Specifically, the standing platform 20 and seating platform 70 are each attached to a tree or other support 300 in tandem fashion with the seating platform 70 being disposed above the standing platform 20. Connecting straps 160 are next connected between the two platforms 20 and 70. Each of flexible connector assemblies 60 are adjusted to ensure that each of platforms 20 and 70 are in a substantially level orientation. In order to climb, the user stands on standing platform 20 facing the tree or other support 300, placing his feet on parallel members 41 and under foot receiving members 44*b* on the standing platform 20. While sitting or otherwise supporting himself by seating platform 70, the user articulates his feet to disengage tree contacting member 26, flexible connector 62, and tree contacting members 50*c* of pivot arms 50 from the tree or support 300. The user then, while supporting his weight on seating platform 70, translates the standing platform 20 a distance up the tree 300 and articulates the standing platform 20 to an orientation where the tree contacting members 26 and 50*c* and flexible connector 62 again engage the tree or support 300 in a leveraged bite. The user can then support his weight on the standing platform 20 and perform a similar maneuver to translate seating platform 70 up the tree.

As the user ascends the tree or support 300, he may adjust either of the standing platform 20 or seating platform 70 to accommodate a narrowed diameter of tree or other support 300. To do this, the user would put his weight entirely on one of the two platforms 20 or 70. The user would then adjust the connector assembly 60 of the other platform to engage a different hole 45 in one of the two pivot arm support members 44 in order to bring the adjusted platform to a substantially level orientation. Once the user makes this adjustment, he may then resume the climbing activity.

Figure 18:
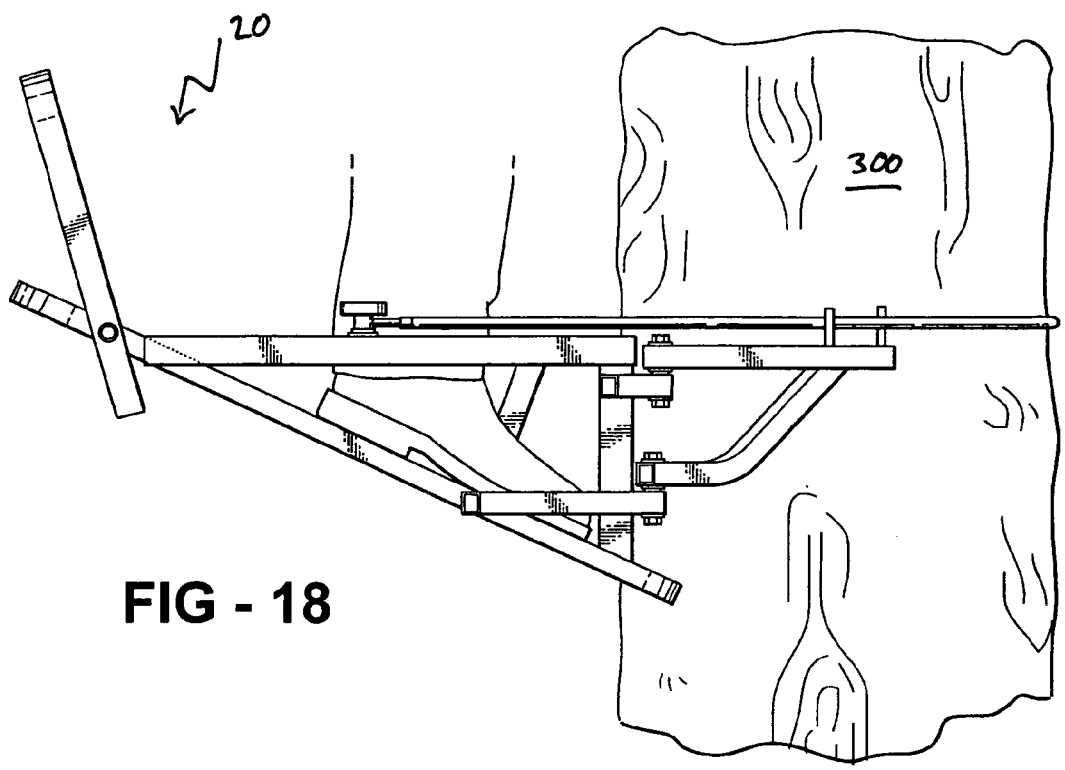
FIG. 18 is a side elevational view of the standing platform having supplemental bracing members of the present invention connected to a tree showing a user's feet in a first position.
Figure 19:
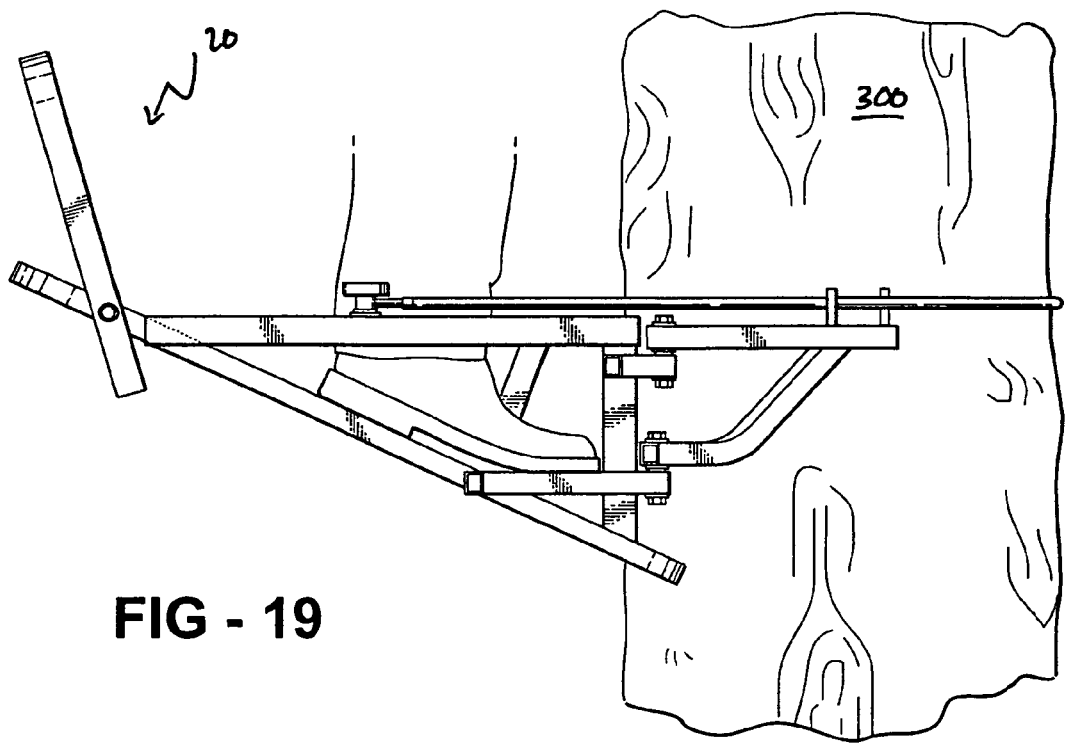
FIG. 19 is a side elevational view of the standing platform having supplemental bracing members of the present invention connected to a tree showing a user's feet in a second position.
Figure 20:
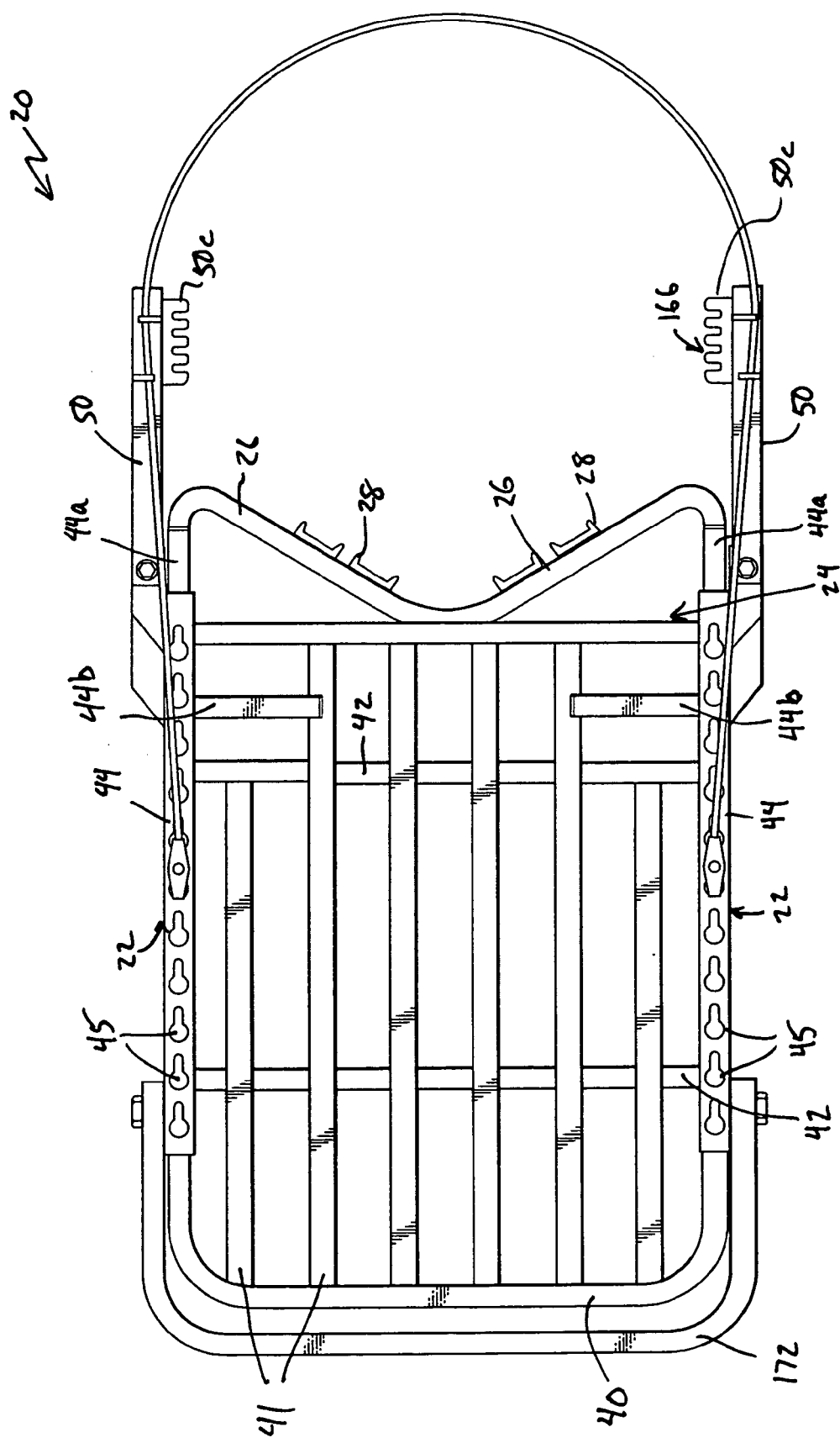
FIG. 20 is a plan view of the standing platform having supplemental bracing members of the present invention.
Figure 21:
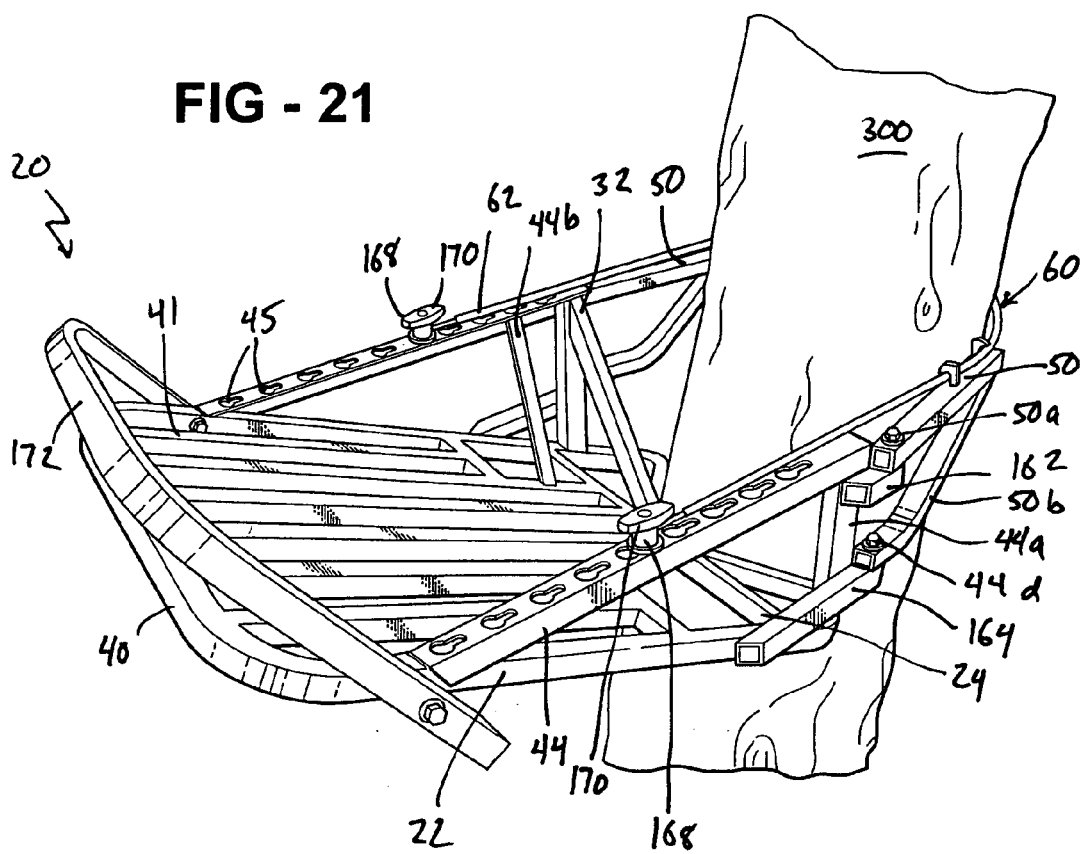
FIG. 21 is a perspective view of the standing platform having supplemental bracing members of the present invention connected to a tree.
Figure 22:
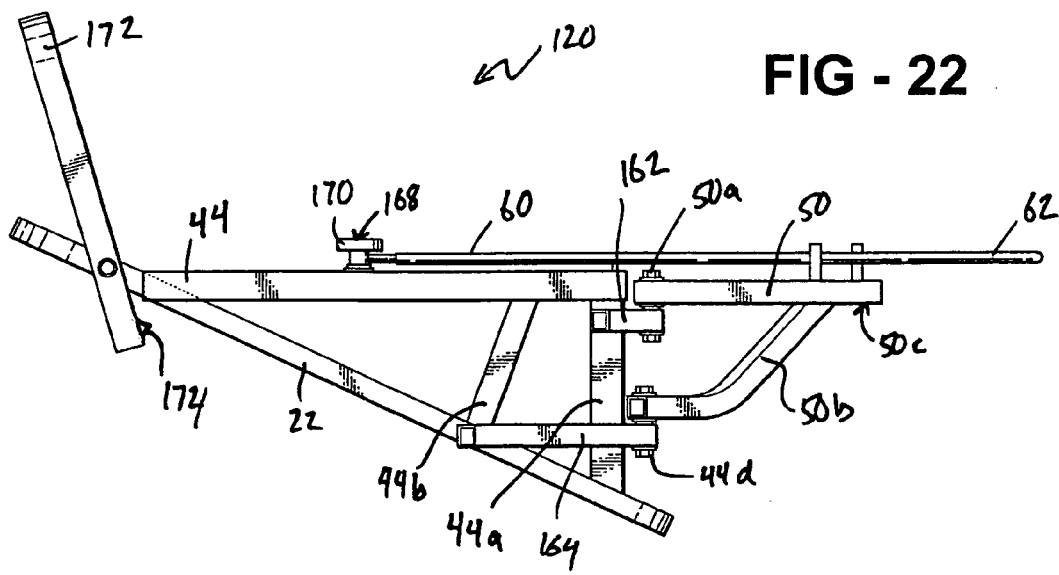
FIG. 22 is a side elevation view of the standing platform having supplemental bracing members of the present invention showing the detail of the combined alternate pivot arm support structure and supplemental bracing members.

In descent, the operation of alternately moving the platforms 20 and 70 is continued, however, each platform is incrementally lowered rather than raised. As users are often fatigued at the end of a hunting or photography session in which they have employed the use of the present invention, it is a common practice for users to make as few adjustments as possible during descent in order to save time and effort. As a consequence, users often allow both platforms 20 and 70 to temporarily rest at increasing angles with respect to the tree or support 300 as the tree or support 300 becomes wider near its base. As the standing platform 20 is lowered in this fashion, it eventually approaches an angle at which the user is unable to further articulate the platform 20 due to the ordinary limits in the range of motion of his feet and ankles, as shown in FIG. 18. When this occurs, the user may relocate his feet in order to stand on supplemental bracing members 164 and yet continue to engage foot receiving members 44*b*, thereby obtaining an improved angle with which to articulate standing platform 20, as shown in FIG. 19. The user may thus complete his descent with a minimum number of interruptions for adjusting standing platform 20.

Figure 23:
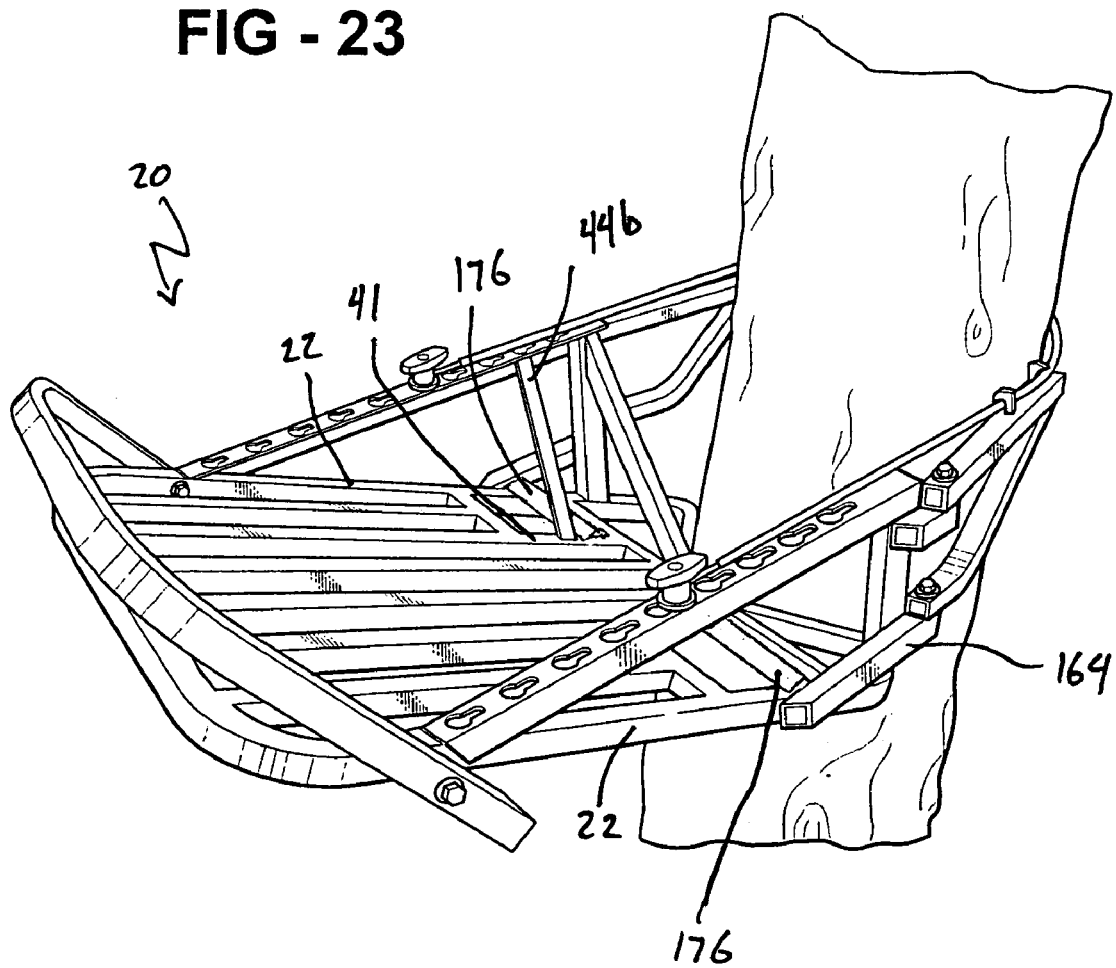
FIG. 23 is a perspective view of the standing platform showing alternate supplemental bracing members of the present invention, connected to a tree.

A variety of supplemental bracing structures may be added to a conventional climbing platform 20 in order to achieve an alternate position for a user's foot. FIG. 23 shows supplemental bracing members 176 which are simply pieces of L-shaped bracing secured to the surface of parallel members 41 and side rails 22 and located substantially under foot receiving members 44*b*. Such supplemental bracing members 176 in this location provide an advantage similar to supplemental bracing member 164 by allowing a user's foot to have additional leverage to maneuver the standing platform 20 in the descending maneuver described above.

While the invention has been described in connection with what is presently considered to be the most practical and preferred embodiment, it is to be understood that the invention is not to be limited to the disclosed embodiments. To the contrary, it is intended to cover various modifications or equivalent arrangements included within the spirit and scope of the appended claims. The scope is to be accorded the broadest interpretation so as to encompass all such modifications and equivalent structures as is permitted under the law.

I claim:

1. A climbing tree stand for engaging a support, comprising:

a first platform member having a first end, a second end, and two substantially parallel side rails connecting said first and second ends thereby substantially defining a first plane;

said first platform member adapted to receive the placement of at least one human foot in a first position;

first and second substantially triangular sides wherein each of said sides is formed from one of said side rails, a pivot arm support member, and a brace member;

said sides substantially defining parallel planes substantially normal to said first plane;

first and second elongated supplemental bracing members each having one end attached to one of said side rails and another end attached to one of said brace members, wherein said elongated supplemental bracing members are each adapted to receive the placement of said at least one human foot in a second position and wherein the elongated supplemental bracing members form a second plane at an acute angle relative to the first plane;

two foot receiving members each attached to the first platform member and one of the pivot arm support members, wherein said foot receiving members are each adapted to engage said at least one human foot in said first and second positions; and a second platform member having a flexible connector for engaging the support.

2. The climbing tree stand of claim 1, further comprising:

a flexible connector removably connected to the pivot arm support members, for engaging the support.

3. A climbing tree stand for engaging a support, comprising:

a first platform member having a first end, a second end, and two substantially parallel side rails connecting said first and second ends thereby substantially defining a first plane;

said first platform member adapted to receive the placement of at least one human foot in a first position;

first and second substantially triangular sides wherein each of said sides is formed from one of said side rails, a pivot arm support member, and a brace member;

said sides substantially defining parallel planes substantially normal to said first plane;

first and second supplemental bracing members each attached to one of said side rails and brace members, wherein said supplemental bracing members are each adapted to receive the placement of said at least one human foot in a second position and wherein the supplemental bracing members form a second plane at an acute angle relative to the first plane;

two foot receiving members each attached to the first platform member and one of the pivot arm support members, wherein said foot receiving members are each adapted to engage said at least one human foot in said first and second positions; and a second platform member having a flexible connector for engaging the support; and two pivot arms each pivotally connected to one of said brace members, respectively, for engaging the support.

* * * * *

UNITED STATES PATENT AND TRADEMARK OFFICE
CERTIFICATE OF CORRECTION

PATENT NO. : 7,156,206 B2 Page 1 of 1
APPLICATION NO. : 11/032246
DATED : January 2, 2007
INVENTOR(S) : Prejean It is certified that error appears in the above-identified patent and that said Letters Patent is hereby corrected as shown below:

- In Col. 3, line 46, delete "elevation" and insert -- elevational --;

- In Col. 4, line 47, delete "user raise" and insert -- user to raise --;

- In Col. 4, line 49, delete "own" and insert -- down --;

- In Col. 4, line 63, delete "have a generally" and insert -- have generally --;

- In Col. 5, line 13, delete "climbing platform 70" and insert -- seating platform 70 --;

- In Col. 5, line 15, delete "climbing platform 70" and insert -- seating platform 70 --;

- In Col. 6, lines 26-27, delete "locking arm" and insert -- fastener --;

- In Col. 7, line 13, delete "in shown" and insert -- is shown --;

- In Col. 7, lines 16-17, delete "seating platform 20" and insert -- standing platform 20 --;

- In Col. 7, lines 17-18, delete "standing platform 70" and insert -- seating platform 70 --;

- In Col. 9, line 42, delete "to, meet" and insert -- to meet --; and

- In Col. 12, line 23, delete "climbing platform 20" and insert -- standing platform 20 --.

Signed and Sealed this

Thirteenth Day of March, 2007

JON W. DUDAS
*Director of the United States Patent and Trademark Office*